(12) United States Patent
Lu et al.

(10) Patent No.: US 9,650,514 B2
(45) Date of Patent: May 16, 2017

(54) ELECTROSTATIC DISSIPATIVE POLYCARBONATE COMPOSITIONS

(75) Inventors: Qiwei Lu, Seven Hills, OH (US); Feina Cao, Canton, MI (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/110,469

(22) PCT Filed: Apr. 19, 2012

(86) PCT No.: PCT/US2012/034181
§ 371 (c)(1),
(2), (4) Date: Oct. 8, 2013

(87) PCT Pub. No.: WO2012/145465
PCT Pub. Date: Oct. 26, 2012

(65) Prior Publication Data
US 2014/0031478 A1 Jan. 30, 2014

Related U.S. Application Data

(60) Provisional application No. 61/477,823, filed on Apr. 21, 2011.

(51) Int. Cl.
| | |
|---|---|
| C08G 18/67 | (2006.01) |
| C08L 51/00 | (2006.01) |
| C08L 69/00 | (2006.01) |
| C08G 18/48 | (2006.01) |
| C08K 3/26 | (2006.01) |
| C09D 17/00 | (2006.01) |
| C08J 3/22 | (2006.01) |
| C08K 3/34 | (2006.01) |
| C08L 75/04 | (2006.01) |
| C08G 18/42 | (2006.01) |
| C08G 18/44 | (2006.01) |
| C08G 18/66 | (2006.01) |
| C08G 18/76 | (2006.01) |

(52) U.S. Cl.
CPC .......... *C08L 75/04* (2013.01); *C08G 18/4277* (2013.01); *C08G 18/44* (2013.01); *C08G 18/4833* (2013.01); *C08G 18/664* (2013.01); *C08G 18/6674* (2013.01); *C08G 18/7671* (2013.01); *C08L 69/00* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 4,912,177 A | 3/1990 | Skochdopole et al. | |
| 6,140,405 A * | 10/2000 | Eckstein et al. | 524/419 |
| 6,284,839 B1 | 9/2001 | Fahey et al. | |
| 2007/0049703 A1* | 3/2007 | Murray et al. | 525/439 |
| 2009/0300946 A1 | 12/2009 | Egbers et al. | |

FOREIGN PATENT DOCUMENTS

| | | |
|---|---|---|
| EP | 0519314 A2 | 12/1992 |
| WO | 2011/046756 A1 | 4/2011 |

OTHER PUBLICATIONS

Ding et al. China Plastics Industry, Issue Z1, 2008, 201-203.*
Translation of Ding et al. (China Plastics Industry, Issue Z1, 2008, 201-203.*

* cited by examiner

*Primary Examiner* — Susannah Chung
*Assistant Examiner* — Robert T Butcher
(74) *Attorney, Agent, or Firm* — Eryn Ace Fuhrer; Teresan W. Gilbert

(57) ABSTRACT

The present invention relates to electrostatic dissipative polycarbonate compositions that are prepared by combining an aromatic polycarbonate polymer with a thermoplastic polyurethane based inherently dissipative polymer and a compatibilizer component that comprises a second thermoplastic polyurethane. This second thermoplastic polyurethane is a reaction product of (a) at least one polyol intermediate, (b) at least one diisocyanate, and (c) at least one chain extender, wherein (a), the polyol intermediate comprises a polycaprolactone polyol, a polycarbonate polyol, or combinations thereof.

18 Claims, No Drawings

ELECTROSTATIC DISSIPATIVE POLYCARBONATE COMPOSITIONS

CROSS REFERENCE TO RELATED APPLICATION

This application claims priority from PCT Application Serial No. PCT/US2012/034181 filed on Apr. 19, 2012, which claims the benefit of U.S. Provisional Application No. 61/477,823 filed on Apr. 21, 2011.

FIELD OF THE INVENTION

The present invention relates to electrostatic dissipative polycarbonate compositions that are prepared by combining an aromatic polycarbonate polymer with a thermoplastic polyurethane based inherently dissipative polymer and a compatibilizer component that comprises a second thermoplastic polyurethane. This compatibilizer is a reaction product of (a) at least one polyol intermediate, (b) at least one diisocyanate, and (c) at least one chain extender, wherein (a), the polyol intermediate comprises a polycaprolactone polyol, a polycarbonate polyol, or combinations thereof.

BACKGROUND OF THE INVENTION

This invention relates to electrostatic dissipative polycarbonate compositions including compositions suitable for injection molding applications.

Polycarbonate (PC) continues to be one of the leading engineering thermoplastics due to its balance of toughness, clarity, high heat deflection properties, dimensional stability, good electrical characteristics, and flame retardancy capabilities. PC is commonly used in injection molding applications.

Thermoplastic polyurethanes (TPU) are unique thermoplastic elastomers with excellent abrasion resistance, outstanding low-temperature performance, excellent mechanical properties, very good tear strength, high elasticity, high transparency, good oil and grease resistance.

Tremendous synergies would be achieved if the strengths of these two materials could be combined. However, due to the relatively high melt viscosity (i.e., low melt flow) of PC, these materials are usually molded at 280-300° C., which is about 50° C. higher than the safe processing temperatures of TPU. Thus, attempts to combine these materials lead to severe degradation of the resulting compositions when they are exposed to the processing temperatures required for the PC component. In addition, poor compatibility between PC and TPU often leads to delamination and poor surface quality in molded parts made from such compositions.

There is a need for compositions that combine the properties of PC and TPU while avoiding the problems of high temperature degradation and delamination and poor surface quality in molded parts resulting from poor compatibility of the components that often result from such combinations. The present invention deals with such compositions.

There is also a need for such compositions to have good electrostatic dissipative (ESD) properties. Currently, antistatic agents or conductive fillers (e.g., carbon black) must be added to many compositions in order to allow their use in various applications, such as packaging applications where good ESD properties are required. Replacing composition that must contain conductive fillers or antistatic agents with compositions that are inherently dissipative would result in safer permanent ESD protection and higher cleanliness. The present invention deals with such compositions.

There is also a need, in the production of ESD sensitive electronic devices, such as hard disk drives, for materials that have good ESD properties, good cleanliness properties (little to no fillers), good mechanical properties, and good thermal properties, which can be injection molded. The present invention deals with such compositions.

SUMMARY OF THE INVENTION

The present invention deals with compositions that combine the properties of PC and TPU while avoiding the problems of high temperature degradation and delamination and poor surface quality in molded parts resulting from poor compatibility of the components that often result from such combinations. The present invention provides effectively compatibilized PC/TPU alloys, which may be suitable for molding applications. The invention also provides for compatibilized PC/TPU alloys where the TPU is an inherently dissipative polymer (IDP). In such embodiments, articles molded from such compositions have permanent electrostatic dissipative (ESD) properties and are thus capable of providing good ESD protection to sensitive electronic components, for example in the production of hard disk drives and other similar devices.

The invention provides an electrostatic dissipative thermoplastic composition comprising: (i) an aromatic polycarbonate polymer; (ii) a thermoplastic polyurethane-based inherently dissipative polymer; and (iii) a compatibilizer comprising a thermoplastic polyurethane different than component (ii). This second thermoplastic polyurethane comprises the reaction product of (a) at least one polyol intermediate, (b) at least one diisocyanate, and (c) at least one chain extender, wherein (a), the polyol intermediate comprises a polycaprolactone polyol, a polycarbonate polyol, or combinations thereof. The compositions may further include one or more performance additives.

The invention further provides for where the compatibilizer includes the reaction product of (a) at least one polycaprolactone polyol, (b) at least one diisocyanate, and (c) at least one alkylene diol chain extender. The invention still further provides for the compatibilizer including a reaction product of (a) at least one polycarbonate polyol, (b) at least one diisocyanate, and (c) at least one alkylene diol chain extender.

The invention further provides for the described compositions where the composition has a heat distortion temperature at least 100° C. as measured under 66 psi according to ASTM D-648, a surface resistivity of between 1E6 and 1E13 ohms per sq as measured under 50% R.H. according to ASTM D-257, a volume resistivity of between 1E6 and 1E13 ohms·cm as measured under 50% R.H. according to ASTM D-257, or any combination thereof.

The invention further provides for a shaped polymeric article comprising any of the electrostatic dissipative thermoplastic composition described herein. In some embodiments, the article is prepared by injection molding.

DETAILED DESCRIPTION OF THE INVENTION

Various features and embodiments of the invention will be described below by way of non-limiting illustration.

The invention provides an electrostatic dissipative thermoplastic composition comprising: (i) an aromatic polycarbonate polymer; (ii) a thermoplastic polyurethane-based inherently dissipative polymer; and (iii) a compatibilizer comprising a thermoplastic polyurethane different than component (ii). This compatibilizer allows the compositions of the invention to successfully combine the aromatic polycarbonate polymer and the thermoplastic polyurethane-based inherently dissipative polymer, yielding a combination, which also may be described as a PC/TPU alloy, that does not suffer from the drawbacks typically found in compositions making such a combination, said drawbacks including but not limited to high temperature degradation and delamination and poor surface quality in molded parts made from such materials.

The Polycarbonate Polymer

The polycarbonate polymer component of the invention is an aromatic polycarbonate polymer. The aromatic polycarbonate polymer is not overly limited Polycarbonates are generally a reaction product of a diol, and in some embodiments a dihydric or polyhydric phenol such as bisphenol A, and carbonic acid, phosgene, and the like. Polycarbonates generally have a repeating carbonate group, i.e., —O—C(O)—O— and generally have a —Ar— radical attached to the carbonate group, where Ar is an aromatic ring, which may contain hydrocarbyl substituent groups. U.S. Pat. No. 3,070,563 is cited and incorporated herein by reference as an example of polycarbonate. Polycarbonates are well known and described in many patents and other technical references. In some embodiments, the polycarbonate, or at least the repeating unit of the polycarbonate, can be characterized by the formula:

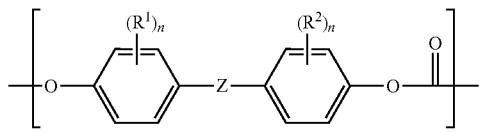

wherein Z is a single bond, an alkylene or alkylidene radical with 1 to 7 carbon atoms, a cycloalkylene or cycloalkylidene radical with 5 to 12 carbon atoms, —O—, —CO—, —SO— or $SO_2$—; in some embodiments Z is methylene or isopropylidene; $R^1$ and $R^2$ are independently hydrogen, halogen or an alkyl radical having 1 to 7 carbon atoms and in some embodiments $R^1$ and $R^2$ are identical; and n equals 0 to 4. In some embodiments, the polycarbonate of the invention is derived from bisphenol A, for example the reaction product of bisphenol A and phosgene.

In some embodiments, the aromatic polycarbonates useful in the invention have a melt flow rate range of about 1 to 60 gms/10 min. at 300° C., as measured by ASTM D-1238. A commercially available polycarbonate from many sources is bis(4-hydroxyphenyl)-2,2-propane, known as bisphenol-A polycarbonate. Examples of suitable polycarbonates are set forth in the Encyclopedia of Polymer Science and Engineering, Vol. 11, John Wiley & Sons, Inc., New York, N.Y., 1985, pages 648-718. In some embodiments, the polycarbonate used in the invention is Lexan® available from G.E. Plastics, or Panlite® available from Teijin, or Makrolon® available from Bayer.

In some embodiments, the aromatic polycarbonate polymer comprises a polycarbonate homopolymer, a polycarbonate copolymer, or a polycarbonate blend, or combinations thereof. Polycarbonate homopolymers are derived from a single polycarbonate monomer, meaning that the repeating units of the Polycarbonate are identical. Polycarbonate copolymers are derived from two or more polycarbonate monomers and so contain two or more different repeating units. These repeating units may be arranged as a random copolymer, a block copolymer, or even a random block copolymer.

In some embodiments, the polycarbonate component is a polycarbonate blend where the polycarbonate component of the blend may be any of the polycarbonates described above, and the blend further includes a polyester polymer, an acrylonitrile butadiene styrene polymer, or a combination thereof.

The TPU-Based IDP

The compositions of the invention may include thermoplastic polyurethane (TPU) based inherently dissipative polymer (IDP). That is a polymer that has electrostatic dissipative (ESD) properties comprising a thermoplastic polyurethane elastomer. Such materials may be generally described as thermoplastic polyurethanes having in their backbone structures hard and/or crystalline segments and/or blocks in combination with soft and/or rubbery segments and/or blocks. In some embodiments, the TPU IDP of the invention is made by reacting (a) at least one polyol intermediate with (b) at least one diisocyanate and (c) at least one chain extender.

In some embodiments, the inherently dissipative polymer, which comprises a thermoplastic polyurethane (TPU), may further comprises a polyolefin polyether copolymer, a thermoplastic polyester elastomer (COPE), a polyether block amide elastomer (COPA or PEBA), or a combination thereof.

Polymers suitable for use in the compositions of the invention may also be described as polymers derived from low molecular weight polyether oligomers, wherein the polymers display relatively low surface and volume resistivities, yet generally are free of excessive levels of extractable anions.

The low molecular weight polyether oligomer useful in the invention can comprise a homopolymer of ethylene oxide having a number average molecular weight of from about 500 to about 5000. The low molecular weight polyether oligomer can also comprise a copolymer of two or more co-polymerizable monomers wherein one of the monomers is ethylene oxide and has a number average molecular weight from about 200 to about 20,000.

Exemplary of the co-monomers which can be copolymerized with ethylene oxide are: 1,2-epoxypropane(propylene oxide); 1,2-epoxybutane; 2,3-epoxybutane(cis & trans); 1,2-epoxypentane; 2,3-epoxypentane(cis & trans); 1,2-epoxyhexane; 2,3-epoxyhexane(cis & trans); 3,4-epoxyhexane(cis & trans); 1,2-epoxy heptane; 1,2-epoxydecane; 1,2-epoxydodecane; 1,2-epoxyoctadecane; 7-ethyl-2-methyl-1,2-epoxyundecane; 2,6,8-trimethyl-1,2-epoxynonane; styrene oxide.

Other co-monomers which can be used as co-monomers with the ethylene oxide are: cyclohexene oxide; 6-oxabicyclo[3,1,0]-hexane; 7-oxabicyclo[4,1,0]heptane; 3-chloro-1,2-epoxybutane; 3-chloro-2,3-epoxybutane; 3,3-dichloro-1,2-epoxypropane; 3,3,3-trichloro-1,2-epoxypropane; 3-bromo-1-2-epoxybutane, 3-fluoro-1,2-epoxybutane; 3-iodo-1,2-epoxybutane; 1,1-dichloro-1-fluoro-2,3-epoxypropane; 1-chloro-1,1-dichloro-2,3-epoxypropane; and 1,1,1,2-pentachloro-3,4-epoxybutane.

Typical co-monomers with at least one ether linkage useful as co-monomers are exemplified by: ethyl glycidyl ether; n-butyl glycidyl ether; isobutyl glycidyl ether; t-butyl glycidyl ether; n-hexyl glycidyl ether; 2-ethylhexyl glycidyl ether; heptafluoroisopropyl glycidyl ether, phenyl glycidyl ether; 4-methyl phenyl glycidyl ether; benzyl glycidyl ether; 2-phenylethyl glycidyl ether; 1,2-dihydropentafluoroisopropyl glycidyl ether; 1,2-trihydrotetrafluoroisopropyl glycidyl ether; 1,1-dihydrotetrafluoropropyl glycidyl ether; 1,1-dihydranonafluoropentyl glycidyl ether; 1,1-dihydropentadecafluorooctyl glycidyl ether; 1,1-dihydropentadecafluorooctyl-alpha-methyl glycidyl ether; 1,1-dihydropentadecafluorooctyl-beta-methyl glycidyl ether; 1,1-dihydropentadecafluorooctyl-alpha-ethyl glycidyl ether; 2,2,2-trifluoro ethyl glycidyl ether.

Other co-monomers with at least one ester linkage which are useful as co-monomers to copolymerize with ethylene oxide are: glycidyl acetate; glycidyl chloroacetate; glycidyl butyrate; and glycidyl stearate; to name a few.

Typical unsaturated co-monomers which can be polymerized with ethylene oxide are: allyl glycidyl ether; 4-vinylcyclohexyl glycidyl ether; alpha-terpinyl glycidyl ether; cyclohexenylmethyl glycidyl ether; p-vinylbenzyl glycidyl ether; allylphenyl glycidyl ether; vinyl glycidyl ether; 3,4-epoxy-1-pentene; 4,5-epoxy-2-pentene; 1,2-epoxy-5,9-cyclododecadiene; 3,4-epoxy-1-vinylchlohexene; 1,2-epoxy-5-cyclooctene; glycidyl acrylate; glycidyl methacrylate; glycidyl crotonate; glycidyl 4-hexenoate.

Other cyclic monomers suitable to copolymerize with ethylene oxide are cyclic ethers with four or more member-ring containing up to 25 carbon atoms except tetrahydropyran and its derivatives. Exemplary cyclic ethers with four or more member-ring are oxetane (1,3-epoxide), tetrahydrofuran (1,5-epoxide), and oxepane (1,6-epoxide) and their derivatives.

Other suitable cyclic monomers are cyclic acetals containing up to 25 carbon atoms. Exemplary cyclic acetals are trioxane, dioxolane, 1,3,6,9-tetraoxacycloundecane, trioxepane, trioxocane, dioxepane and their derivatives.

Other suitable cyclic monomers are cyclic esters containing up to 25 carbon atoms. Exemplary cyclic esters are beta-valerolactone, epsilon-caprolactone, zeta-enantholactone, eta-caprylactone, butyrolactone and their derivatives. The low molecular weight polyether oligomer prepared by the method detailed immediately above then can be reacted with a variety of chain extenders and modified with a selected salt to form the electrostatic dissipative polymer additive or antistatic agent of the invention.

In one embodiment of the polyester-ether block copolymer comprises the reaction product of ethylene glycol, terephthalic acid or dimethyl terephthalate and polyethylene glycol. These and other examples of other polyester-ether copolymers which can be utilized are set forth in the Encyclopedia of Polymer Science and Engineering, Vol. 12, John Wiley & Sons, Inc., NY, N.Y., 1988, pages 49-52, which is hereby fully incorporated by reference as well as U.S. Pat. Nos. 2,623,031; 3,651,014; 3,763,109; and 3,896,078.

Alternatively, the low molecular weight polyether oligomer can be reacted to form an electrostatic dissipative agent comprising one or more polyamide blocks as well as one or more low molecular weight polyether oligomer blocks. Alternatively, the low molecular weight polyether oligomer may be reacted with the polyamide in the presence of a di-acid to form a polyether ester amide. Further information on this type of polymer can be found in U.S. Pat. No. 4,332,920.

In some embodiments, the TPU IDP is made by reacting at least one polyol intermediate with at least one diisocyanate and at least one chain extender. The polyol intermediate may be a polyalkylene glycol and/or a poly(dialkylene glycol ester). Suitable polyalkylene glycols include polyethylene glycol, polypropylene glycol, polyethyleneglycol-polypropylene glycol copolymers, and combinations thereof. Suitable poly(dialkylene glycol ester)polyol intermediates may be derived from at least one dialkylene glycol and at least one dicarboxylic acid, or an ester or anhydride thereof. The polyol intermediate may also be a mixture of two or more different types of polyols. In some embodiments, the polyol intermediate includes a polyester polyol and a polyether polyol. In some embodiments, the polyol intermediate includes a polyester diol, a polyether diol, or combinations thereof.

Referring first to the polyester intermediate, a hydroxyl terminated, saturated polyester polymer is synthesized by reacting excess equivalents of diethylene glycol with lesser equivalents of an aliphatic, preferably an alkylene, dicarboxylic acid having four to ten carbon atoms where the most preferred is adipic acid.

The hydroxyl terminated polyester oligomer intermediate is further reacted with excess equivalents of non-hindered diisocyanate along with extender glycol in a so-called one-shot or simultaneous co-reaction of oligomer, diisocyanate, and extender glycol to produce the very high molecular weight linear polyurethane having an average molecular weight broadly from about 60,000 to about 500,000, or from about 80,000 to about 180,000, or even from about 100,000 to about 180,000.

Alternatively, an ethylene ether oligomer glycol intermediate comprising a polyethylene glycol can be co-reacted with non-hindered diisocyanate and extender glycol to produce the high molecular weight, polyurethane polymer. Useful polyethylene glycols are linear polymers of the general formula H—$(OCH_2CH_2)_n$—OH where n is the number of repeating ethylene ether units and n is at least 11 and between 11 and about 115. On a molecular weight basis, the useful range of polyethylene glycols have an average molecular weight from about 500 to about 5000 and preferably from about 700 to about 2500. Commercially available polyethylene glycols useful in this invention are typically designated as polyethylene glycol 600, polyethylene glycol 1500, and polyethylene glycol 4000.

In accordance with this invention, high molecular weight thermoplastic polyurethanes are produced by reacting together preferably in a one-shot process the ethylene ether oligomer glycol intermediate, an aromatic or aliphatic non-hindered diisocyanate, and an extender glycol. On a mole basis, the amount of extender glycol for each mole of oligomer glycol intermediate is from about 0.1 to about 3.0 moles, desirably from about 0.2 to about 2.1 moles, and preferably from about 0.5 to about 1.5 moles. On a mole basis, the high molecular weight polyurethane polymer comprises from about 0.97 to about 1.02 moles, and preferably about 1.0 moles of non-hindered diisocyanate for every 1.0 total moles of both the extender glycol and the oligomer glycol (i.e., extender glycol+oligomer glycol-1.0).

Useful non-hindered diisocyanates comprise aromatic non-hindered diisocyanates and include, for example, 1,4-diisocyanatobenzene (PPDI), 4,4'-methylene-bis(phenyl isocyanate) MDI), 1,5-naphthalene diisocyanate (NDI), m-xylene diisocyanate (XDI), as well as non-hindered, cyclic aliphatic diisocyanates such as 1,4-cyclohexyl diisocyanate (CHDI), and $H_{12}$ MDI. The most preferred diisocyanate is MDI. Suitable extender glycols (i.e., chain extenders) are aliphatic short chain glycols having two to six carbon atoms and containing only primary alcohol groups. Preferred glycols include diethylene glycol, 1,3-propane diol, 1,4-butane diol, 1,5-pentane diol, 1,4-cyclohexane-dimethanol, hydroquinone di(hydroxyethyl)ether, and 1,6-hexane diol with the most preferred glycol being 1,4-butane diol.

In accordance with the invention, the hydroxyl terminated ethylene ether oligomer intermediate, the non-hindered diisocyanate, and the aliphatic extender glycol are co-reacted simultaneously in a one-shot polymerization process at a temperature above about 100° C. and usually about 120° C., whereupon the reaction is exothermic and the reaction temperature is increased to about 200° C. to above 250° C.

In some embodiments, the IDP is: (a) a chain extended low molecular weight polyoxirane; (b) a chain extended low molecular weight polyester polyol derived from at least one dialkylene glycol and at least one dicarboxylic acid, ester, or anhydride; or (c) a combination thereof.

The chain extended low molecular weight polyoxirane may be a chain extended polyether oligomer, wherein the polyether oligomer includes a homopolymer or copolymer of polyethylene glycol (PEG), polypropylene glycol (PPG), or combination thereof. In other words, the IDP contains PEG and/or PPG segments. The homopolymer or copolymer of PEG may be a homopolymer of ethylene glycol having a weight average molecular weight of about 500 to about 2500 or a copolymer of ethylene glycol and at least one other glycol where the copolymer has a weight average molecular weight of about 500 to about 5000.

The chain extended low molecular weight polyoxirane may also comprise: a polyether amide block copolymer, a polyether-ester block copolymer, a polyolefin polyether copolymer, or a combination thereof. The dialkylene glycol may include: oxydimethanol, diethylene glycol, dipropylene glycol, 3,3-oxydipropan-1-ol, dibutylene glycol, or combinations thereof.

In some embodiments, the TPU IDP of the invention is made by reacting (a) at least one polyol intermediate with (b) at least one diisocyanate and (c) at least one chain extender, wherein the polyol intermediate comprises a polyester polyol, a polyoxirane, or combinations thereof.

In some embodiments, the polyester polyol is derived from at least one dialkylene glycol and at least one dicarboxylic acid or an ester or anhydride thereof. The acid may contain from 4 to 15 carbon atoms and the glycol may contain from 2 to 8 carbon atoms. In some embodiments, the acid is succinic acid, glutaric acid, adipic acid, pimelic acid, suberic acid, azelaic acid, sebacic acid, dodecanedioic acid, isophthalic acid, terephthalic acid, cyclohexane dicarboxylic acid, or combinations thereof. In some embodiments the glycol can be oxydimethanol, diethylene glycol, dipropylene glycol, 3,3-oxydipropan-1-ol, dibutylene glycol, or combinations thereof.

In any of the embodiments described herein, the polyoxirane may include a polyethylene glycol, a polypropylene glycol, or a combination thereof. In some embodiments, the polyoxirane includes a polyethylene glycol or a polypropylene glycol.

In still other embodiments, the TPU IDP component further includes an ionic additive. Suitable examples of the ionic additive include metal containing salts, ionic liquids, or combinations thereof, described in more detail in the sections below.

In some embodiments, the TPU IDP is the reaction product of (a) at least one polyol intermediate, (b) at least one diisocyanate, and (c) at least one chain extender, where the diisocyanate is different from that used to prepare the compatibilizer component, the polyol intermediate is different from that used to prepare the compatibilizer component, or combinations thereof, and in some of these embodiments the TPU IDP further comprises an ionic liquid.

The Compatibilizer

The compositions of the invention include a compatibilizer component which includes a TPU different than component (ii), the TPU-based IDP, described above. This second TPU comprises the reaction product of (a) at least one polyol intermediate, (b) at least one diisocyanate, and (c) at least one chain extender, where the polyol intermediate comprises a polycaprolactone polyol, a polycarbonate polyol, or combinations thereof.

In general, the compatibilizer component of the invention may include any of the TPU described above, or be made from any of the TPU components described above, so long as the diisocyanate is different from that used to prepare the compatibilizer component, the polyol intermediate is different from that used to prepare the compatibilizer component, or combinations thereof.

In some embodiments, the TPU of the compatibilizer is prepared from a polyol intermediate that comprises a polycarbonate polyol, which may also be described as a hydroxyl terminated polycarbonate.

Suitable polycarbonate polyol intermediates can be made from diols such as those set forth herein, including 1,6-hexanediol, and the like, and phosgene; or by transesterification with low molecular weight carbonates such as diethyl or diphenyl carbonate. The hydroxyl terminated polycarbonate can also be prepared by reacting a glycol with a carbonate. Such polycarbonates are generally linear and have terminal hydroxyl groups with essential exclusion of other terminal groups. The essential reactants are glycols and carbonates. Suitable glycols are selected from cycloaliphatic and aliphatic diols containing from 4 to 40, or from 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as butanediol-1,4, pentanediol-1,5, neopentyl glycol, hexanediol-1,6, heptanediol-1,7, octanediol-1,8,2-ethylhexanediol-1,6,2,2,4-trimethylhexanediol-1,6, decanediol-1,10 hydrogenated dilinoleylglycol, hydrogenated dioleylglycol and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product. Suitable carbonates are selected from alkylene carbonates composed of a 5 to 7 membered ring having the following general formula:

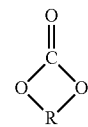

where R is a saturated divalent radical containing 2 to 4 linear carbon atoms (thus forming the 5 to 7 membered ring), but may overall contain from 2 to 6 carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When only one group is cycloaliphatic, the other can be either alkyl or aryl. On the other hand, if only one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100 to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100 to 300° C. preferably at 150 to 250° C., under a reduced pressure of 10 to 30 mm Hg, preferably 50 to 200 mm Hg. A fractionating column may be used in some embodiments to separate a by-product glycol from the reaction mixture. The by-product glycol may be taken off the top of the column and the unreacted alkylene carbonate and glycol reactant may be returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100 to 300° C., preferably 150 to 250° C. and at a pressure of 0.1 to 10 mm Hg until the desired molecular weight of the hydroxyl terminated polycarbonate is attained. Molecular weight of the hydroxyl terminated polycarbonates can vary from about 500 to about 10,000 but in a preferred embodiment, it will be in the range of 500 to 2500.

The hydroxyl terminated polycarbonates are available commercially. Poly(hexamethylene carbonate)glycol with an OH number range of 50-60.

In some embodiments, the TPU of the compatibilizer is prepared from a polyol intermediate that comprises a polycaprolactone polyol, which may also be described as a hydroxyl terminated polycaprolactone.

Suitable polycaprolactone polyols are commercially available from companies such as, for example, Union Carbide Corp. of Danbury, Conn. Hydroxyl terminated polycaprolactones can be formed by reaction of a caprolactone with a glycol. Suitable caprolactones include epsilon-caprolactone and methyl epsilon-caprolactone. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Methods for the preparation of hydroxyl terminated polycaprolactones are generally known to those of ordinary skill in the art.

The diisocyanate used in the preparation of the compatibilizer is not overly limited, though is some embodiments where the polyol intermediate used in the preparation of the compatibilizer is the same as that used in the preparation of the TPU IDP, the diisocyanate used in the preparation of the compatibilizer is different from that used in the preparation of the TPU IDP.

Suitable diisocyanates generally have the formula $R(NCO)_n$ where n is 2, however polyisocyanates may also be included where n is 2 to 4. Thus, in some embodiments, the diisocyanate component of the invention may include polyisocyanates having a functionality of 3 or 4 but only in very small amounts, for example less than 5% and desirably less than 2% by weight based upon the total weight of all polyisocyanates, inasmuch as they cause crosslinking. R can be aromatic, cycloaliphatic, and aliphatic, or combinations thereof generally having a total of from 2 to about 20 carbon atoms.

Examples of suitable aromatic diisocyanates include diphenyl methane-4,4'-diisocyanate (MDI), $H_{12}$ MDI, m-xylylene diisocyanate (XDI), m-tetramethyl xylylene diisocyanate (TMXDI), phenylene-1,4-diisocyanate (PPDI), 1,5-naphthalene diisocyanate (NDI), and diphenylmethane-3,3'-dimethoxy-4,4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,10-decane diisocyanate, and trans-dicyclohexylmethane diisocyanate (HMDI). A highly preferred diisocyanate is MDI containing less than about 3% by weight of ortho-para (2,4) isomer.

The chain extender used in the preparation of the compatibilizer may be any of the chain extenders described above. Generally, they are lower aliphatic or short chain glycols having from about 2 to about 10 carbon atoms and include for instance ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexandiol, 1,3-butanediol, and 1,5-pentanediol. Aromatic glycols can also be used as the chain extender and are the preferred choice for high heat applications. Benzene glycol (HQEE) and xylylene glycols are suitable chain extenders for use in making the TPU of this invention. Xylylene glycol is a mixture of 1,4-di(hydroxymethyl)benzene and 1,2-di(hydroxymethyl)benzene. Benzene glycol specifically includes hydroquinone, i.e., bis(beta-hydroxyethyl)ether also known as 1,4-di(2-hydroxyethoxy)benzene; resorcinol, i.e., bis (beta-hydroxyethyl)ether also known as 1,3-di(2-hydroxyethyl)benzene; catechol, i.e., bis(beta-hydroxyethyl)ether also known as 1,2-di(2-hydroxyethoxy)benzene; and combinations thereof. In some embodiments, the chain extender includes 1,4-butanediol, 1,6-hexandiol, or a mixture thereof, for example, a 50:50 mixture on a weight basis or a 50:50 mixture on a molar basis. In still other embodiments, the chain extender includes 1,4-butanediol (BDO).

In some embodiments, the compatibilizer comprises (i) a TPU prepared from a polycarbonate polyol, H12MDI or MDI, and BDO, (ii) a TPU prepared from a polycaprolactone polyol, H12MDI or MDI, and BDO, or (iii) combinations thereof. Commercially available examples of such materials include PC3575A and Pellethane™ 2102.

In general, the compatibilizer component of the invention may include any of the TPU described above so long as the diisocyanate is different from that used to prepare the compatibilizer component, the polyol intermediate is different from that used to prepare the compatibilizer component, or combinations thereof. However, in some embodiments, the compatibilizer includes the reaction product of (a) at least one polycaprolactone polyol, (b) at least one diisocyanate, and (c) at least one alkylene diol chain extender, and in some of these embodiments the diisocyanate is different from the diisocyanate used to prepare the TPU IDP described above.

In still other embodiments, the compatibilizer is prepared using (b) a diisocyanate comprising 4,4'-methylene diphenyl diisocyanate (MDI), dicyclohexylmetheno-4,4'-diisocyanate (H12MDI), or combinations thereof, and (c) a chain extender comprising 1,4-butandiol, 1,6-hexandiol, or combinations thereof. In some embodiments, the chain extender is 1,4-butandiol.

Additional Additives

The compositions of the invention may further include additional useful additives, either as separate components or mixed into one or more of the components described above, where such additives can be utilized in suitable amounts. These optional additional additives include fillers, reinforcing fillers, pigments, heat stabilizers, UV stabilizers, flame retardants, plasticizers, rheology modifiers, processing aids, lubricants, mold release agents, additional ESD additives, and combinations thereof. Useful pigments include opacifying pigments such as titanium dioxide, zinc oxide, and titanate yellow. Useful pigments also include tinting pigments such as carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallastonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV stabilizers include 2-(2'-hydroxyphenol)benzotriazoles and 2-hydroxybenzophenones. Additives can also be used to improve the hydrolytic stability of the TPU polymer. Each of these optional additional additives described above may be present in, or excluded from, the compositions described herein.

In some embodiments, the optional additional additives include waxes, release agents, antioxidants, reinforcing fillers, pigments, flame retardants in addition to the polyphosphonate polymer component, or combinations thereof. Suitable reinforcing fillers include mineral fillers and glass fibers.

In some embodiments, the compositions of the invention are substantially free to free of fluorine atoms, chlorine atoms, bromine atoms, iodine atoms, astatine atoms, or combinations thereof (including ions of said atoms). In some embodiments, the compositions of the invention are substantially free to free of salts and/or other compounds containing fluorine, chlorine, bromine, iodine, and/or astatine atoms, and/or ions of one or more thereof. In some embodiments, the compositions of the invention are substantially free to free of all halogens atoms, halogen-containing salts, and/or other halogen-containing compounds. Here, by substantially free, it is meant that the compositions contain less than 10,000 parts per million or even 10,000 parts per billion of fluorine/fluoride, chorine/chloride, bromine/bromide, iodine/iodide, astatine/astatide, or combinations of the atoms/ions thereof.

In some embodiments, the compositions may include a flame retardant additive, for example, a polyphosphonate polymer. Suitable polyphosphonate polymers may include a homopolymer of a phosphonate, a copolymer of two or more phosphonates, or a combination thereof. Phosphonates, or phosphonic acids are organic compounds that may be represented by the structure: $R^1\!-\!P(\!=\!O)(\!-\!OR^2)(\!-\!OR^3)$ wherein each $R^1$, $R^2$, and $R^3$ is independently a hydrocarbyl group or hydrogen, typically containing from 1 to 10 carbon atoms.

These polyphosphonate polymers are distinct from phosphine oxide-based materials (for example, those described in U.S. Pat. No. 7,893,143) and in some embodiments, the compositions of the invention are substantially free of, or even free of, phosphine oxide-based materials. The polyphosphonate polymers of the present invention each contain multiple phosphorus atoms, as the phosphonate is the repeating unit of the polymer. In contrast, phosphine oxide-based materials generally have a single phosphorus atom.

Examples of phosphonates, which may be used to prepare suitable polyphosphonates, include: 2-aminoethylphosphonic acid, dimethyl methylphosphonate, 1-hydroxy ethylidene-1,1-diphosphonic acid, amino tris(methylene phosphonic acid), ethylenediamine tetra(methylene phosphonic acid), tetramethylenediamine tetra(methylene phosphonic acid), hexamethylenediamine tetra(methylene phosphonic acid), diethylenetriamine penta(methylene phosphonic acid), phosphonobutane-tricarboxylic acid, N-(phosphonomethyl)iminodiacetic acid, 2-carboxyethyl phosphonic acid, 2-hydroxyphosphonocarboxylic acid, and amino-tris-(methylene-phosphonic acid).

In some embodiments, the polyphosphonate may include a polyphosphonate homopolymer, a polyphosphonate-polycarbonate block copolymer; or a combination thereof. Suitable materials are available commercially from FRX™ Polymers, Inc. In some embodiments, the polyphosphonate polymer is a polyalkylphosphonate, and is free of polyarylphosphonates, or at least substantially free of polyarylphosphonates.

Suitable flame retardant additives also include brominated organic compound, for example, a brominated diol, which in some embodiments may be used in combination with the polyphosphonate polymer described above. Suitable brominated organic compound may contain from 5 to 20 carbon atoms, and in some embodiments 5 to 10, or even 5 carbon atoms, and may contain a quaternary carbon atom. In addition to the ranges described above, this additional additive may be present in an amount sufficient to provide the desired flame retardancy, and in other embodiments may be present from 0 to 15 percent by weight of the overall composition, or even from 0 to 10, from 0.1 to 7, or from 0.2 to 5 percent by weight of the overall composition. Suitable examples of brominated organic compound include brominated diols, brominated mono-alcohols, brominated ethers, brominated esters, brominated phosphates, and combinations thereof. Suitable brominated organic compounds may include tetrabromobisphenol-A, hexabromocyclododecane, poly(pentabromobenzyl acrylate), pentabromobenzyl acrylate, tetrabromobisphenol A-bis(2,3-dibromopropyl ether), tribromophenol, dibromoneopentyl glycol, tribromoneopentyl alcohol, tris(tribromoneopentyl) phosphate, and 4,4'-isopropylidenebis[2-(2,6-dibromophenoxy)ethanol].

In some embodiments, the flame retardant additive includes a metal salt of a halogen borate, metal salt of halogen phosphate, or a combination thereof. In some embodiments, the secondary flame retardant additive includes a metal salt of organic sulphonate, for example, a sodium salt of an alkyl benzene sulfonate. In some embodiments, the secondary flame retardant additive includes a nitrogen-containing compound. These secondary flame retardant additives may be present as a separate component added to the composition, or they may be present as an additional additive in one of the components described above, particularly the inherently dissipative polymer, which is used to prepare the compositions of the invention.

In still further embodiments, the compositions of the invention include a halogen-free metal salt of an amidoalkanesulfonic acid, a hydrocarbyl-substituted benzene sulfonic acid, or a mixture thereof. The salts may also be a salt of a polymer derived from a halogen-free metal salt of an amidoalkanesulfonic acid, a hydrocarbyl-substituted benzene sulfonic acid, or a mixture thereof. In some embodiments, the salt is mixed in the TPU IDP, which is then combined with the other components described above to prepare the compositions of the invention, while in other embodiments the salt is added to a composition that already includes the various components described above.

In some embodiments, the salt is a halogen-free metal salt of an amidoalkanesulfonic acid or polymer derived from said acid or salt thereof where said acid is represented by the formula:

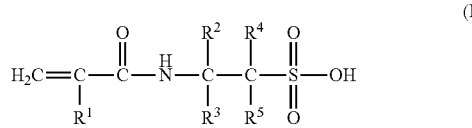

(I)

wherein $R^1$ is hydrogen or a hydrocarbyl group; and each $R^2$, $R^3$, $R^4$ and $R^5$ is independently hydrogen, a hydrocarbyl group, or —$CH_2SO_3H$. In some embodiments, $R^1$ contains from 1 to 7 carbon atoms or from 1 to 6, 1 to 3 or is a mixture of hydrogen and hydrocarbyl groups containing from 1 to 3 carbon atoms. In some embodiments, $R^1$ is hydrogen. In some embodiments, each $R^2$, $R^3$, $R^4$ and $R^5$ is independently hydrogen or a hydrocarbyl group containing from 1 to 16 or from 1 to 7 carbon atoms or even from 1 to 6, 3 or even 2 carbon atoms.

One suitable example of these materials is 2-acrylamido-2-methylpropane sulfonic acid (The commercial grade material is believed to include a byproduct fraction containing two sulfonic acid groups as described above. This and related materials are similarly considered to be a part of the invention). This material is commercially available from The Lubrizol Corporation as AMPS® monomer. Other useful materials of this type include 2-acrylamidoethanesulfonic acid, 2-acrylamidopropanesulfonic acid, 2-methacrylamidopropanesulfonic acid, and 2-methacrylamido-2-methylpropanesulfonic acid. Such materials and methods for their preparation are disclosed, for instance, in U.S. Pat. No. 3,544,597 and U.S. Pat. No. 6,448,347.

In some embodiments, the salt is a halogen-free metal salt of a hydrocarbyl-substituted benzene sulfonic acid or polymer derived from said acid where said acid is represented by the formula:

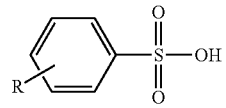

where R is a hydrocarbyl group containing from 2 to 24 or even 2 to 20 carbon atoms. In some embodiments, R contains from 2 to 15 or 11 to 15 carbon atoms. In some embodiments, the acid of formula above may contain one or more additional substituent groups, where the additional substituent group may be located anywhere on the aromatic ring, just as the R group above is shown, and may contain 1 to 2 carbon atoms.

Suitable examples include alkenyl and/or alkyl substituted benzene sulfonic acids or polymer derived thereof. In some embodiments, the salt is derived from an alkenyl substituted benzene sulfonic acid such as styrene sulfonic acid and/or sulfonates. In some embodiments, the salt is derived from an alkyl substituted benzene sulfonic acid such as linear alkyl benzene sulfonic acids and/or sulfonates.

The salts of the invention may be formed by salting the acids described above with an alkali and/or alkaline earth metal. In some embodiments, the acids are salted with lithium, sodium, potassium, magnesium, calcium, or combinations thereof. In some embodiments, the salts of the invention are sodium or lithium salts, and in other embodiments lithium salts.

As noted above, the salts of the invention may be salts of polymers derived from one or more of the acids described above. These polymers may be homopolymers, copolymers or even terpolymers. Well-known methods and materials, such as acrylic acid and similar materials described in the sections above, may be used in the polymerizations of the acids described herein.

In some embodiments, the salts of the invention include: a sodium salt of an amidoalkanesulfonic acid represented by the formula (I) above; a lithium salt of an amidoalkanesulfonic acid represented by the formula (I) above; a lithium salt of styrene sulfonic acid; a copolymer of a lithium salt of styrene sulfonic acid and acrylic acid; a copolymer of a lithium salt of an amidoalkanesulfonic acid represented by the formula (I) above and acrylic acid; a terpolymer of a lithium salt of an amidoalkanesulfonic acid represented by the formula (I) above, a lithium salt of styrene sulfonic acid, and acrylic acid; or combinations thereof. In additional embodiments, sodium equivalents of any of the lithium examples described above may also be prepared.

While the exact mechanism of attachment and/or attraction of the salt to the polymer reaction product is not completely understood, the salt can unexpectedly improve the surface and volume resistivities of the resulting polymer as well as that of any composition into which the polymer is blended, and may accomplish this without the presence of unacceptably high levels of extractable anions. Moreover, the static decay times may remain in an acceptable range, that is, the times are not too fast or too slow. Further, the salt may also work to improve the flame retardancy of the polymer, as well as any composition in which the polymer is blended. In addition, in some embodiments, it is noted that the salt enhances one or more of these benefits while not impacting the clarity and/or transparency of the overall composition in which the salt is used and/or in which the inherently dissipative polymer which contains the salt is used.

The compositions of the invention, and in some embodiments, the inherently dissipative polymers described above, may also contain one or more other salts that are effective as an ESD additive, in place of or in combination with the salts described above. In some embodiments, these additional salts include metal-containing salts that contain a metal other than lithium. These salts may also include halogen-containing salts. Such salts include metal-containing salts, salt complexes, or salt compounds formed by the union of metal ion with a non-metallic ion or molecule. The amount of salt present may be an amount effective to provide improved ESD properties to the inherently dissipative polymers and/or the overall composition. Any of these salt components may be added during the one-shot polymerization process used to prepare the inherently dissipative polymer.

Suitable salts include halogen-free lithium-containing salt such as those represented by the formula:

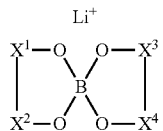

wherein each —$X^1$—, —$X^2$—, —$X^3$—, and —$X^4$— is independently —C(O)—, —C($R^1R^2$)—, —C(O)—C($R^1R^2$)— or —C($R^1R^2$)—C($R^1R^2$)— where each $R^1$ and $R^2$ is independently hydrogen or a hydrocarbyl group and wherein the $R^1$ and $R^2$ of a given X group may be linked to form a ring. In some embodiments, the salt is represented by the structure above wherein —$X^1$—, —$X^2$—, —$X^3$— and —$X^4$— are —C(O)—. Suitable salts also include the open, -ate structures of such salts, including Lithium bis(oxalate) borate.

In some embodiments, the halogen-free lithium-containing salt comprises lithium bis(oxalato)borate, lithium bis(glycolato)borate, lithium bis(lactato)borate, lithium bis(malonato)borate, lithium bis(salicylate)borate, lithium (glycolato oxalato) borate, or combinations thereof.

Additional examples of salts that may be used in place of or in combination with those described above: Li—$ClO_4$, Li—N($CF_3SO_2$)$_2$, Li—$PF_6$, Li—$AsF_6$, Li—I, Li—Cl, Li—Br, Li—SCN, Li—$SO_3CF_3$, Li—$NO_3$, Li—C($SO_2CF_3$)$_3$, $Li_2$S, Li—$OSO_2CF_3$ and Li—$MR_4$, where M is Al or B, and R is a halogen, hydrocarbyl, alkyl or aryl group. In one embodiment, the salt is Li—N($CF_3SO_2$)$_2$, which is commonly referred to as lithium trifluoromethane sulfonamide, or the lithium salt of trifluoromethane sulfonic acid.

For any of these salts, the effective amount of the selected salt added to the one-shot polymerization may be at least about 0.10, 0.25, or even 0.75 parts by weight based on 100 parts by weight of the polymer.

The compositions of the invention may also include a non-metal containing anti-stat additives, such as ionic liquids. Suitable liquids include tri-n-butylmethylammonium bis-(trifluoroethanesulfonyl)imide (available as FC-4400 from 3M™), one or more the Basionics™ line of ionic liquids (available from BASF™), and similar materials.

In some embodiments, the invention allows for the use of solvent with the metal containing salt. The use of a solvent, may in some embodiments, allow a lower charge of salt to provide the same benefit in ESD properties. Suitable solvents include ethylene carbonate, propylene carbonate, dimethyl sulfoxide, tetramethylene sulfone, tri- and tetra ethylene glycol dimethyl ether, gamma butyrolactone, and N-methyl-2-pyrrolidone. When present, the solvent may be used at least about 0.10, 0.50 or even 1.0 parts by weight based on 100 parts by weight of the polymer. In some embodiments, the compositions of the invention are substantially free of to free of any or all of the solvents described herein.

In other embodiments, the compositions of the invention are substantially free of to free of any or all of the metal containing salts and/or substantially free of to free of any ESD additives except for the a halogen-free metal salts of an amidoalkanesulfonic acid, a hydrocarbyl-substituted benzene sulfonic acid, or a mixture thereof, or a polymer derived from a halogen-free metal salt of an amidoalkanesulfonic acid, a hydrocarbyl-substituted benzene sulfonic acid, or a mixture thereof, described above.

The effective amount of the selected salt in the inherently dissipative polymer, or evening the overall composition, may be at least about 0.10 parts based on 100 parts of the polymer, and in some embodiments, at least about 0.25 parts or even at least about 0.75 parts. In some embodiments, these amounts are with respect to each individual salt present in the composition. In other embodiments, the amounts apply to the total amount of all salts present in the composition.

In some embodiments, the additional additives present in the composition include a wax, an antioxidant, a hydrolysis stabilizer, a UV stabilizer, a dye, a flame retardant, a reinforcing filler, a pigment, or a combination thereof. Suitable reinforcing fillers include glass fibers, glass beads, carbon fibers, talc, calcium carbonate, or combinations thereof.

The compositions of the invention may contain from 30 to 80 percent by weight aromatic polycarbonate; 10 to 40 percent by weight thermoplastic polyurethane based inherently dissipative polymer; and 1.5 to 8 percent by weight compatibilizer. In some embodiments the composition contains from 30 to 70 or 80 percent by weight aromatic polycarbonate; from 10 to 25, 30 or 40 percent by weight thermoplastic polyurethane based inherently dissipative polymer; and from 1.5 to 5, 4 or 8 percent by weight compatibilizer. In some embodiments, the compositions of the invention contain from 30 to 80, 40 to 80, 50 to 70 or even 56 to 70 percent by weight aromatic polycarbonate; from 10 to 40, 20 to 40, 20 to 30 or even 20 to 25 percent by weight thermoplastic polyurethane based inherently dissipative polymer; and from 1.5 to 8, 2 to 8, 2 to 5, or even 4 to 5 percent by weight compatibilizer. In any other these embodiments, additional additives may be present in the composition from 0 to 30, 1 to 30, 1 to 20, 5 to 20, 1 to 5, or 5 to 10 percent by weight.

INDUSTRIAL USE

The compositions of the invention are useful in various applications but are of particular use in applications that can benefit from the combination of properties of PC and TPU while avoiding the problems of high temperature degradation and delamination and poor surface quality in molded parts resulting from poor compatibility of the components that often result from such combinations. The present invention deals with such compositions.

The compositions of the invention are also of use in application that also require good electrostatic dissipative (ESD) properties, especially when the good ESD properties can be provided without the need for an antistatic agent or conductive filler.

The compositions of the invention are also very useful in the production of hard disk drives, as the described materials have good ESD properties, good cleanliness properties (little to no fillers), good mechanical properties, and good thermal properties, which can be injection molded.

In some embodiments, the invention deals with the use of the compositions described herein in one or more of these described applications.

In some embodiments, the compositions of the invention have a heat distortion temperature at least 100° C. as measured under 66 psi according to ASTM D-648. In other embodiments, the heat distortion, under the same conditions, is at least 110, 120 or even 130° C.

In some embodiments, the compositions of the invention have a surface resistivity of between 1E6 and 1E13 ohms per sq as measured under 50% R.H. according to ASTM D-257, or a volume resistivity of between 1E6 and 1E13 ohms·cm as measured under 50% R.H. according to ASTM D-257, or a combination thereof. In other embodiments, the surface resistivity, under the same conditions, is between 1E6 and 1E13, 1E7 and 1E12, 1E8 and 1E11, or even 1E9 and 1E10. In other embodiments, the volume resistivity, under the same conditions, is between 1E6 and 1E13, 1E7 and 1E12, 1E8 and 1E11, or even 1E9 and 1E10.

The invention also includes a shaped polymeric article which may be made from any of the compositions described herein. The compositions can be used with various melt processing techniques including injection molding, compression molding, slush molding, extrusion, thermoforming cast, rotational molding, sintering, and vacuum molding. Articles of this invention may also be made from resins produced by the suspension, mass, emulsion or solution processes. In some embodiments, the article is prepared by extrusion. In other embodiments, the article is prepared by injection molding. Where the article is prepared by injection molding, the article may be packaging materials for electronic components or parts, construction components of clean rooms, parts or tools used in clean rooms, wire coating, cable jacketing, or any combination thereof. In some embodiments, the compositions and articles of the extruded sheets, that is sheets made of the described electrostatic dissipative thermoplastic composition formed by extrusion.

In some embodiments, the electrostatic dissipative thermoplastic composition of the invention is prepared from: (i) an aromatic polycarbonate polymer; (ii) a thermoplastic polyurethane-based inherently dissipative polymer; and (iii) a compatibilizer; wherein the composition has a heat distortion temperature of at least 100° C. as measured under 66 psi according to ASTM D-648; a surface resistivity of between 1E6 and 1E13 ohms per sq as measured under 50% R.H. according to ASTM D-257, or a volume resistivity of between 1E6 and 1E13 ohms·cm as measured under 50% R.H. according to ASTM D-257, or a combination thereof.

It is known that some of the materials described above may interact in the final formulation, so that the components of the final formulation may be different from those that are initially added. The products formed thereby, including the products formed upon employing the composition of the invention in its intended use, may not be susceptible of easy description. Nevertheless, all such modifications and reaction products are included within the scope of the invention; the invention encompasses the composition prepared by admixing the components described above.

EXAMPLES

The invention will be further illustrated by the following examples, which sets forth particularly advantageous embodiments. While the examples are provided to illustrate the invention, they are not intended to limit it.

All of examples described below are prepared by compounding a polymer blend on a twin-screw extruder using conventional conditions. The resulting blends are then converted into various test parts, including sheets with a thickness of 30–40 mils using a single-screw extruder.

Example Set 1

A set of examples is prepared by blending (i) an aromatic polycarbonate polymer (PC), (ii) a thermoplastic polyurethane (TPU) based inherently dissipative polymer (IDP), and (iii) a compatibilizer (COMPAT), at various levels. The formulation of each example is summarized in the table below:

TABLE I

Example Set 1 Formulations[1]

|  | Comp Ex 1-1 | Ex 1-2 | Ex 1-3 | Ex 1-4 | Ex 1-5 |
| --- | --- | --- | --- | --- | --- |
| PC-1[2] | 70 | 70 | 70 | 70 | 70 |
| TPU IDP-1[3] | 30 | 25 | 25 | 25 | 25 |
| COMPAT-1[4] |  | 5 |  |  |  |
| COMPAT-2[5] |  |  | 5 |  |  |
| COMPAT-3[6] |  |  |  | 5 |  |
| COMPAT-4[7] |  |  |  |  | 5 |
| Total | 100.0 | 100.0 | 100.0 | 100.0 | 100.0 |

[1]All formulation values in the table are in parts by weight.
[2]PC-1 is a commercially available aromatic polycarbonate polymer, sold under the Panlite ® product family.
[3]TPU IDP-1 is a thermoplastic polyurethane based inherently dissipative polymer prepared from PEG, MDI and BDO, and further includes an ionic liquid salt.
[4]COMP-1 is a TPU prepared from a polycarbonate polyol, H12MDI and BDO.
[5]COMP-2 is a TPU prepared from a polycarbonate polyol, MDI and BDO.
[6]COMP-3 is a TPU prepared from a polycaprolactone polyol, MDI and BDO, where the resulting TPU has a Shore A hardness of 75.
[7]COMP-4 is a TPU prepared from a polycaprolactone polyol, MDI and BDO, where the resulting TPU has a Shore A hardness of 90.

The examples described above were tested to evaluate their mechanical properties, there thermal properties, and their ESD properties. Results of this testing is summarized below:

TABLE II

Example Set 1 Results

|  | Comp Ex 1-1 | Ex 1-2 | Ex 1-3 | Ex 1-4 | Ex 1-5 |
| --- | --- | --- | --- | --- | --- |
| ASTM D638 |  |  |  |  |  |
| Tensile Strength at Yield | 3510 psi | 6050 psi | 5670 psi | 5240 psi | 5290 psi |
|  | 24.2 MPa | 41.7 MPa | 39.1 MPa | 36.1 MPa | 36.5 MPa |
| Tensile Strain at Yield (%) | 4.3 | 5.7 | 6.0 | 7.0 | 7.0 |
| Tensile Strength at Break | 3440 psi | 4740 psi | 5190 psi | 4920 psi | 5250 psi |
|  | 23.7 MPa | 32.7 MPa | 35.8 MPa | 33.9 MPa | 36.2 MPa |
| Tensile Strain at Break (%) | 4.3 | 28.6 | 54.2 | 54.4 | 72.7 |
| Tensile Modulus | 175k psi | 254k psi | 242k psi | 221k psi | 221k psi |
|  | 1207 MPa | 1751 MPa | 1669 MPa | 1524 MPa | 1524 MPa |
| Energy to Break | 12.9 lbs-in | 199 lbs-in | 351 lbs-in | 333 lbs-in | 449 lbs-in |
|  | 1.5 Nm | 22.5 Nm | 39.7 Nm | 37.6 Nm | 50.7 Nm |

TABLE II-continued

Example Set 1 Results

|  | Comp Ex 1-1 | Ex 1-2 | Ex 1-3 | Ex 1-4 | Ex 1-5 |
|---|---|---|---|---|---|
| ASTM D970-95 (0.5 in/min) | | | | | |
| Flexural Modulus | 145k psi | 214k psi | 197k psi | 182k psi | 177k psi |
|  | 1000 MPa | 1476 MPa | 1358 MPa | 1255 MPa | 1220 MPa |
| ASTM D256-93a | | | | | |
| Notched IZOD Impact | 1.2 ft-lb/in | 22.1 ft-lb/in | 14.6 ft-lb/in | 15.3 ft-lb/in | 13.5 ft-lb/in |
|  | 0.34 J/cm | 6.41 J/cm | 4.24 J/cm | 4.45 J/cm | 3.92 J/cm |
| Type of Break | Complete | Partial | Partial | Partial | Partial |
| ASTM D-648 | | | | | |
| HDT at 66 psi/5 MPa (° C.) | 120 | 110 | 113 | 119 | 121 |
| ASTM D-257 (50% RH) | | | | | |
| Surface Resistivity (ohms/sq) | 7.9E+09 | 3.5E+09 | 3.6E+09 | 3.5E+09 | 4.3E+09 |
| Volume Resistivity (ohm-cm) | 8.4E+09 | 1.1E+10 | 1.2E+10 | 1.4E+10 | 1.3E+10 |

The results show that the compositions of the invention provide significantly improved mechanical properties and ESD properties, while also providing at least comparable thermal properties.

Example Set 2

A second set of examples is prepared by blending (i) an aromatic polycarbonate polymer (PC), (ii) a thermoplastic polyurethane (TPU) based inherently dissipative polymer (IDP), (iii) a compatibilizer (COMPAT) and (iv) a filler, at various levels. The formulation of each example is summarized in the table below:

TABLE III

Example Set 2 Formulations[1]

|  | Ex 2-1 | Ex 2-2 | Ex 2-3 | Ex 2-4 | Ex 2-5 |
|---|---|---|---|---|---|
| PC-1[2] | 63.0 | 59.5 | 56.0 | 59.5 | 56.0 |
| TPU IDP-1[3] | 22.5 | 21.25 | 20.0 | 21.25 | 20.0 |

TABLE III-continued

Example Set 2 Formulations[1]

|  | Ex 2-1 | Ex 2-2 | Ex 2-3 | Ex 2-4 | Ex 2-5 |
|---|---|---|---|---|---|
| COMPAT-4[4] | 4.5 | 4.25 | 4.0 | 4.25 | 4.0 |
| FILLER-1[5] | 10.0 | 15.0 | 20.0 | 10.0 | 15.0 |
| FILLER-2[6] |  |  |  | 5.0 | 5.0 |
| Total | 100.0 | 100.0 | 100.0 | 100.0 | 100.0 |

[1]All formulation values in the table are in parts by weight.
[2]PC-1 is a commercially available aromatic polycarbonate polymer, sold under the Panlite ® product family.
[3]TPU IDP-1 is a thermoplastic polyurethane based inherently dissipative polymer prepared from PEG, MDI and BDO, and further includes an ionic liquid salt.
[4]COMP-4 is a TPU prepared from a polycaprolactone polyol, MDI and BDO, where the resulting TPU has a Shore A hardness of 90.
[5]FILLER-1 is a commercially available glass fiber filler.
[6]FILLER-2 is a commercially available carbon fiber filler.

The examples described above were tested to evaluate their mechanical properties, there thermal properties, and their ESD properties. Results of this testing is summarized below:

TABLE IV

Example Set 2 Results

|  | Ex 2-1 | Ex 2-2 | Ex 2-3 | Ex 2-4 | Ex 2-5 |
|---|---|---|---|---|---|
| ASTM D638 | | | | | |
| Tensile Strength at Yield | 7730 psi | 8520 psi | 10300 psi | 8440 psi | 8970 psi |
|  | 53.3 MPa | 58.7 MPa | 71.0 MPa | 58.2 MPa | 61.8 MPa |
| Tensile Strain at Yield (%) | 3.9 | 3.4 | 3.1 | 2.7 | 2.4 |
| Tensile Strength at Break | 6360 psi | 7770 psi | 10300 psi | 7790 psi | 8700 psi |
|  | 43.9 MPa | 53.6 MPa | 71.0 MPa | 53.7 MPa | 60.0 MPa |
| Tensile Strain at Break (%) | 6.9 | 4.6 | 3.3 | 3.7 | 2.9 |
| Tensile Modulus | 453k psi | 554k psi | 702k psi | 718k psi | 887k psi |
|  | 3123 MPa | 3820 MPa | 4840 MPa | 4950 MPa | 6116 MPa |
| Energy to Break (lbs-in) | 52.4 lbs-in | 35.3 lbs-in | 28.8 lbs-in | 30.3 lbs-in | 23.1 lbs-in |
|  | 5.9 Nm | 4.0 Nm | 3.3 Nm | 3.4 Nm | 2.6 Nm |
| ASTM D970-95 (0.5 in/min) | | | | | |
| Flexural Modulus | 317k psi | 384k psi | 492k psi | 481k psi | 575k psi |
|  | 2186 MPa | 2648 MPa | 3392 MPa | 3316 MPa | 3965 MPa |
| ASTM D256-93a | | | | | |
| Notched IZOD Impact | 3.8 ft-lb/in | 3.8 ft-lb/in | 3.2 ft-lb/in | 2.9 ft-lb/in | 2.9 ft-lb/in |
|  | 1.12 J/cm | 1.12 J/cm | 0.93 J/cm | 0.85 J/cm | 0.83 J/cm |
| Type of Break | Partial | Partial | Partial | Hinged | Hinged |

TABLE IV-continued

Example Set 2 Results

|  | Ex 2-1 | Ex 2-2 | Ex 2-3 | Ex 2-4 | Ex 2-5 |
|---|---|---|---|---|---|
| ASTM D-648 | | | | | |
| HDT at 66 psi/5 MPa (° C.) | 130 | 128 | 129 | 129 | 129 |
| ASTM D-257 (50% RH) | | | | | |
| Surface Resistivity (ohms/sq) | 1.2E+10 | 7.6E+09 | 1.1E+10 | 8.8E+09 | 8.2E+09 |
| Volume Resistivity (ohm-cm) | 9.4E+09 | 6.9E+09 | 7.6E+09 | 6.5E+09 | 5.6E+09 |

The results show that the compositions of the invention provide good mechanical properties, ESD properties, and thermal properties, and in comparison to the comparative example in Example Set 1, provide significantly improved mechanical properties while also providing at least comparable thermal properties and ESD properties, even with significant amounts of filler present.

As used herein, and unless otherwise defined, the expression "substantially free of" may mean that and amount that does not materially affect the basic and novel characteristics of the composition under consideration, in some embodiments, it may also mean no more than 5%, 4%, 2%, 1%, 0.5% or even 0.1% by weight of the material is questions is present, in still other embodiments, it may mean that less than 1,000 ppm, 500 ppm or even 100 ppm of the material in question is present.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

We claim:

1. An electrostatic dissipative thermoplastic composition comprising:
   (i) an aromatic polycarbonate polymer;
   (ii) a thermoplastic polyurethane-based inherently dissipative polymer comprising the reaction product of at least one polyol intermediate, at least one diisocyanate, and at least one chain extender; and
   (iii) a compatibilizer comprising a thermoplastic polyurethane wherein said compatibilizer thermoplastic polyurethane comprises the reaction product of at least one polycaprolactone polyol, at least one diisocyanate, wherein the diisocyanate is selected from 4,4'-methylene diphenyl diisocyanate, dicyclohexylmetheno-4,4'-diisocyanate, or combinations thereof, and at least one alkylene diol chain extender;
   wherein the polyol intermediate used to prepare component (ii) is different from that used to prepare component (iii).

2. The composition of claim 1 further comprising:
   (iv) one or more performance additives.

3. The composition of claim 1, wherein said aromatic polycarbonate polymer is selected from polycarbonate homopolymers, polycarbonate copolymers, polycarbonate blends, or combinations thereof.

4. The composition of claim 3, wherein the polycarbonate blend comprises a polycarbonate homopolymer, a polycarbonate copolymer, or a combination thereof, blended with a polyester polymer, an acrylonitrile butadiene styrene polymer, or a combination thereof.

5. The composition of claim 1, wherein said thermoplastic polyurethane based inherently dissipative polymer is made by reacting (a) at least one polyol intermediate with (b) at least one diisocyanate and (c) at least one chain extender;
   wherein the polyol intermediate comprises a polyester polyol, a polyoxirane, or combinations thereof.

6. The composition of claim 5 wherein said polyester polyol is derived from at least one dialkylene glycol and at least one dicarboxylic acid or an ester or anhydride thereof.

7. The composition of claim 5 wherein said polyoxirane is selected from polyethylene glycols, polypropylene glycols, or combinations thereof.

8. The composition of claim 1 wherein said thermoplastic polyurethane based inherently dissipative polymer further comprises an ionic additive.

9. The composition of claim 1 wherein said thermoplastic polyurethane based inherently dissipative polymer comprises the reaction product of (a) at least one polyol intermediate, (b) at least one diisocyanate, and (c) at least one chain extender, and
   wherein the diisocyanate is different from that used to prepare component (iii), the polyol intermediate is different from that used to prepare component (iii), or combinations thereof; and
   wherein said thermoplastic polyurethane based inherently dissipative polymer further comprises an ionic liquid.

10. The composition of claim 1 further comprising (iv) one or more additives wherein said one or more additives are selected from a wax, an antioxidant, a hydrolysis stabilizer, a UV stabilizer, a dye, a flame retardant, a reinforcing filler, a pigment, or a combination thereof.

11. The composition of claim 10 wherein said reinforcing filler is selected from the group consisting of glass fibers, glass beads, carbon fibers, talc, calcium carbonate, or combinations thereof.

12. The composition of claim 1 wherein the overall composition is from 30 to 80 percent by weight aromatic polycarbonate; 10 to 40 percent by weight thermoplastic polyurethane based inherently dissipative polymer; and 1.5 to 8 percent by weight compatibilizer.

13. The composition of claim 1 having a heat distortion temperature at least 100° C. as measured under 66 psi according to ASTM D-648.

14. The composition of claim 1 having a surface resistivity of between 1E6 and 1E13 ohms per sq as measured under 50% R.H. according to ASTM D-257, or a volume resistivity of between 1E6 and 1E13 ohms·cm as measured under 50% R.H. according to ASTM D-257, or a combination thereof.

15. A shaped polymeric article comprising the electrostatic dissipative thermoplastic composition of claim 1.

16. The shaped polymeric article of claim 15 wherein said article is prepared by injection molding.

17. The shaped polymeric article of claim 15 wherein said article comprises: packaging materials for electronic components or parts, construction components of clean rooms, parts or tools used in clean rooms, wire coating, cable jacketing, or combinations thereof.

18. An electrostatic dissipative thermoplastic composition comprising:

(i) an aromatic polycarbonate polymer;
(ii) a thermoplastic polyurethane-based inherently dissipative polymer comprising the reaction product of at least one polyol intermediate, at least one diisocyanate, and at least one chain extender; and
(iii) a compatibilizer comprising the reaction product of at least one polycaprolactone polyol, at least one diisocyanate wherein the diisocyanate is selected from 4,4'-methylene diphenyl diisocyanate, dicyclohexylmetheno-4,4'-diisocyanate, or combinations thereof, and at least one alkylene diol chain extender;
wherein the polyol intermediate used to prepare component (ii) is different from that used to prepare component (iii);
wherein the composition has a heat distortion temperature of at least 100° C. as measured under 66 psi according to ASTM D-648; a surface resistivity of between 1E6 and 1E13 ohms per sq as measured under 50% R.H. according to ASTM D-257, or a volume resistivity of between 1E6 and 1E13 ohms·cm as measured under 50% R.H. according to ASTM D-257, or a combination thereof.

* * * * *